United States Patent
Lu et al.

(10) Patent No.: US 7,759,268 B2
(45) Date of Patent: Jul. 20, 2010

(54) REFRACTORY CERAMIC COMPOSITE AND METHOD OF MAKING

(75) Inventors: Yanxia Lu, Painted Post, NY (US); Elizabeth Margaret Wheeler, Lindley, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 11/705,272

(22) Filed: Feb. 12, 2007

(65) Prior Publication Data

US 2008/0125307 A1    May 29, 2008

Related U.S. Application Data

(60) Provisional application No. 60/861,113, filed on Nov. 27, 2006.

(51) Int. Cl.
*C04B 35/49* (2006.01)
(52) U.S. Cl. ...................... 501/106; 501/102
(58) Field of Classification Search .................. 501/102, 501/109, 106; 65/17.2, 17.3
See application file for complete search history.

(56) References Cited

U.S. PATENT DOCUMENTS 5,032,556 A * 7/1991 Mori et al. ................. 501/106
2003/0121287 A1   7/2003 Chalk et al.
2004/0055338 A1   3/2004 Helfinstine et al.
2005/0130830 A1 * 6/2005 Ames et al. ................. 501/103

FOREIGN PATENT DOCUMENTS

JP         17-200295        7/2005

OTHER PUBLICATIONS

Shi et al., "Synthesis and Characterization of Ultrafine Zircon Powder", Ceramics International 24 (1998) pp. 393-400.
Valero et al., "Hydrothermal Synthesis of Porous Zircon in Basic Fluorinated Medium", Microporous and Mesopurous Materials 29 (1999) pp. 311-318.
Veytizou et al., "Preparation of Zircon Bodies From Amorphous Precursor Powder Synthesized by Sol-Gel Processing", J. of the European Ceramic Society 22 (2002) pp. 2901-2909.

* cited by examiner

*Primary Examiner*—Jessica L Ward
*Assistant Examiner*—Nicholas P D'Aniello
(74) *Attorney, Agent, or Firm*—Siwen Chen

(57) ABSTRACT

A method for manufacturing a refractory ceramic body is disclosed. The method comprises contacting a zirconia precursor, a silica precursor, a sol-gel forming agent, and a preformed zircon. The method can further comprise forming the composition into a desired shape and firing the desired shape to form a dense, creep resistant refractory body. An article made by the methods above is disclosed, wherein a fine particle zircon is formed within and/or between grains of a preformed zircon.

22 Claims, 3 Drawing Sheets

US 7,759,268 B2

REFRACTORY CERAMIC COMPOSITE AND METHOD OF MAKING

CROSS-REFERENCE TO RELATED APPLICATIONS

This application claims the benefit of priority under 35 U.S.C. §119(e) of U.S. Provisional Application Ser. No. 60/861,113, filed on Nov. 27, 2006, the content of which is relied upon and incorporated herein by reference in its entirety.

BACKGROUND OF THE INVENTION

1. Field of the Invention

The present invention relates to refractory ceramic materials and the use of such materials in the manufacture of sheet glass by the fusion process.

2. Technical Background

The fusion process is one of the basic techniques used to produce sheet glass and can produce sheet glass having surfaces with superior flatness and smoothness relative to sheet glass produced by alternative processes, such as for example, the float and slot drawn processes. As a result, the fusion process has found advantageous use in the production of the glass substrates used in the manufacture of light emitting displays, such as liquid crystal displays (LCDs).

The fusion process, specifically, the overflow downdraw fusion process, includes a supply pipe which provides molten glass to a collection trough formed in a refractory body known as an isopipe. During the overflow downdraw fusion process, molten glass passes from the supply pipe to the trough and then overflows the top of the trough on both sides, thus forming two sheets of glass that flow downward and then inward along the outer surfaces of the isopipe. The two sheets meet at the bottom or root of the isopipe, where they fuse together into a single sheet. The single sheet is then fed to drawing equipment that controls the thickness of the sheet by the rate at which the sheet is drawn away from the root. The drawing equipment is located well downstream of the root so that the single sheet has cooled and become rigid before coming into contact with the equipment.

The outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

The dimensional stability of an isopipe during the glass forming process can affect the overall success of the manufacturing process, as well as the properties of the manufactured glass sheet. In the overflow downdraw fusion process, an isopipe can be subjected to temperatures of about 1,000° C. While exposed to these temperatures, an isopipe must support its own weight, the weight of the molten glass contained within the isopipe and overflowing its sides, and at least some tensional force that is transferred back to the isopipe through the fused glass as it is being drawn.

Commercial and market factors require a continuous increase in the size of light emitting displays and thus, the size of sheet glass. Depending on the width of the sheet glass to be produced, an isopipe can have an unsupported length of about 1.5 meters or more.

To withstand these demanding conditions, isopipes have conventionally been manufactured from isostatically pressed blocks of refractory material (hence the name "iso-pipe"). In particular, isostatically pressed zircon refractories have been used to form isopipes for the fusion process. Conventional zircon refractories are comprised of $ZrO_2$ and $SiO_2$, or equivalently $ZrSiO_4$, and sintering additives. Even with such high performance materials, isopipe materials can creep, resulting in dimensional changes which limit their useful life. In particular, isopipes exhibit sag such that the middle of the unsupported length of the pipe drops below the height of its outer supported ends.

Thus, there is a need to address dimensional stability and other shortcomings associated with conventional isopipes and methods for manufacturing sheet glass. These needs and other needs are satisfied by the composition and methods of the present invention.

SUMMARY OF THE INVENTION

The present invention relates to a refractory ceramic material that can be used in the manufacture of sheet glass by, for example, the overflow downdraw fusion process, and specifically to an isopipe designed to control sag during use. The present invention addresses at least a portion of the problems described above through the use of a novel refractory ceramic composition and method of making.

In a first aspect, the present invention provides a method of making a zircon composition comprising: contacting at least one zirconia precursor and/or a sol made from the at least one zirconia precursor, at least one silica precursor and/or a sol made from the at least one silica precursor, at least one sol-gel forming agent, and a preformed zircon to form a mixture of zircon and a zircon precursor, wherein the at least one sol-gel forming agent is in a quantity sufficient to form a sol of the at least one zirconia precursor and the at least one silica precursor, and wherein the contacting is in any order.

In a second aspect, the present invention provides a mixture of zircon and a zircon precursor made by the method described above.

In a third aspect, the present invention provides an article formed from the mixture described above.

Additional aspects and advantages of the invention will be set forth, in part, in the detailed description, figures, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the present invention and together with the description, serve to explain, without limitation, the principles of the invention. Like numbers represent the same elements throughout the figures.

DETAILED DESCRIPTION OF THE INVENTION

Figure 1:
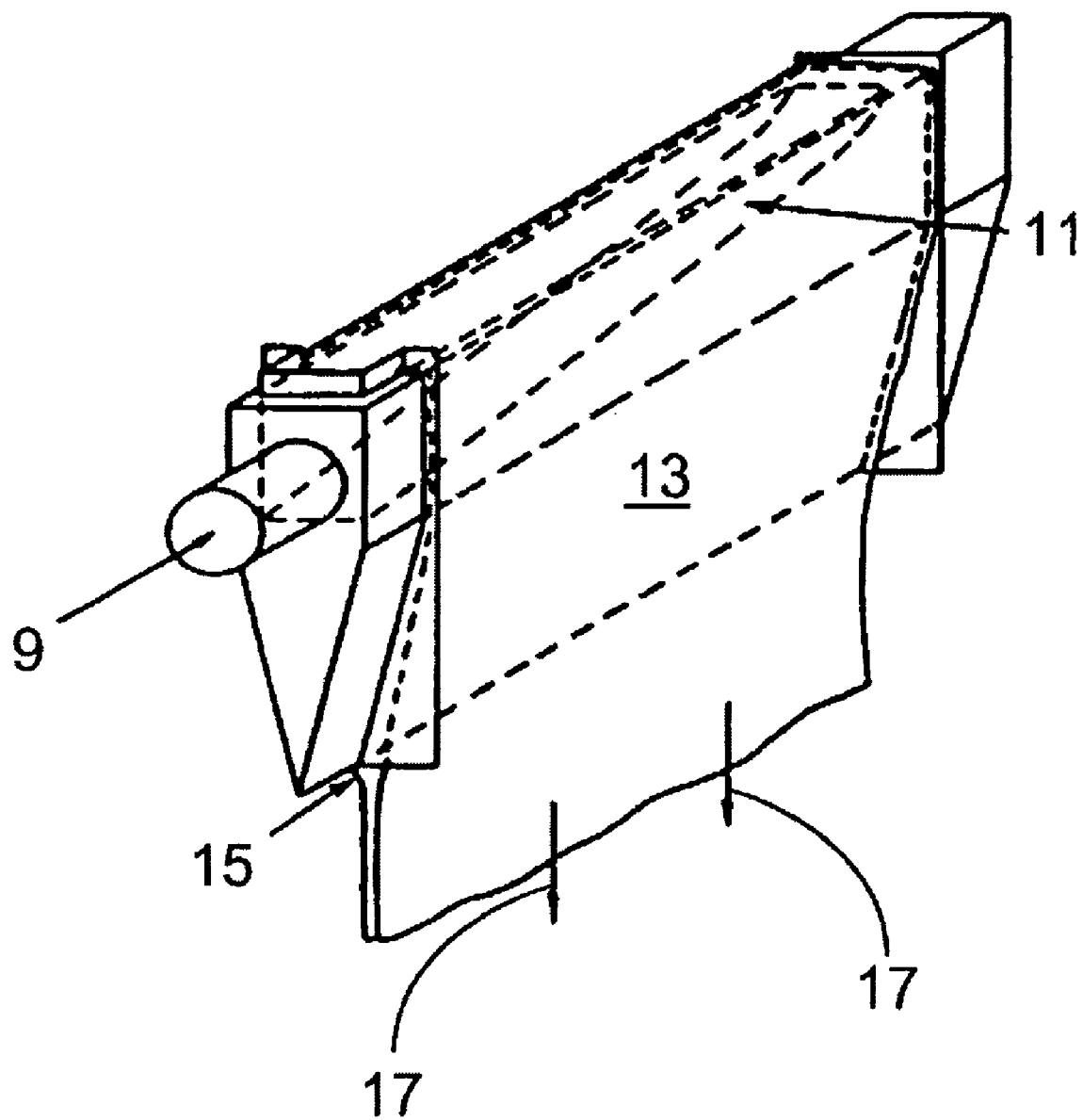
FIG. 1 is a schematic diagram illustrating a representative construction for an isopipe for use in an overflow downdraw fusion process for making sheet glass, in accordance with one aspect of the present invention.

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its currently known aspects. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination aspect, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes aspects having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the description includes both aspects of the invention including and excluding the component.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As used herein, the term "isopipe" refers to any sheet forming delivery system used in a fusion process which produces flat glass wherein at least a part of the delivery system comes into contact with the glass just prior to fusion, irrespective of the configuration or the number of components making up the delivery system.

As used herein, the term "pore" or "pores" refers to a vacancy or void within and/or between grains of a refractory material. The term "pore" is intended to describe vacancies and/or voids of varying sizes, but is not intended to describe inter-atomic spaces within a material.

The following U.S. patents and published applications describe various compositions and methods for manufacturing sheet glass, and they are hereby incorporated by reference in their entirety and for the specific purpose of disclosing materials and methods relating to the formation of refractory ceramics, isopipes, and the manufacture of sheet glass: U.S. Pat. Nos. 3,338,696; 3,682,609; 3,437,470; 6,794,786; and Japanese Patent Publication No.11-246230.

As briefly introduced above, the present invention provides a method for manufacturing an improved refractory ceramic body that, for example, can be useful as an isopipe in the manufacture of sheet glass. The isopipe of the present invention can have enhanced dimensional stability and longevity over conventional isopipes used in the manufacture of sheet glass.

Although the compositions, refractory bodies, and methods of the present invention are described below with respect to the manufacture of isopipes and sheet glass, it should be understood that the same or similar compositions and methods can be used in other applications where dimensionally stable refractory materials are required. Accordingly, the present invention should not be construed in a limited manner.

With reference to the drawings, FIG. 1 illustrates a schematic of an isopipe, typical of those used in the manufacture of sheet glass by, for example, the overflow downdraw fusion process. A conventional isopipe and sheet glass manufacturing system comprises a supply pipe 9 that provides molten glass to a collection trough 11 formed in a refractory body 13 known as an isopipe. During operation, molten glass can flow from the supply pipe to the trough where it can overflow the top of the trough of both sides, forming two sheets of glass that flow downward and then inward along the outer surfaces of the isopipe. The two sheets meet at the bottom or root 15 of the isopipe where they can fuse together into a single sheet. The single sheet is then fed to drawing equipment (represented by arrows 17), which controls the rate at which the sheet is drawn away from the root, and thus, the thickness of the sheet. The drawing equipment is typically positioned downstream of the root such that the formed sheet glass has sufficiently cooled and become rigid before contacting the equipment.

Conventional isopipes can be comprised of preformed, commercially available zircon materials (Ferro Corporation, Penn Yan, New York, USA). Preformed zircon materials can be classified by particle size and one or more classifications can be mixed together to produce a zircon useful for forming an isopipe. The one or more conventional zircon materials can be formed into a desired shape, such as an isopipe, and fired, producing a polycrystalline refractory ceramic body. A challenge in the formation of such a refractory ceramic body is achieving a dense structure that is resistant to creep. Creep, as used herein, refers to the tendency of a material to move or to deform to relieve a stress. Such deformation can occur as a result of long-term exposure to levels of stress that are below the yield or ultimate strength of the material and can be greater in materials that are subjected to heat for long periods of time. Lowering the creep rate of a refractory material such as, for example, an isopipe, can result in less sag during use. Creep rate can accelerate in low density or high grain-boundary refractory materials, such as those having large amounts of pores located at grain boundaries and/or triple points.

Creep can occur in various forms, such as Nabarro-Herring creep (stress driven bulk diffusion within grains) and/or Cobble creep (grain-boundary diffusion). Not wishing to be bound by theory, Nabarro-Herring creep can be related to the concentration and size of pores within a material, such as within and/or between grains of a ceramic, and can be proportional to grain size. A reduction in the concentration and/or size of pores between grains of a ceramic material can result in increased creep resistance. Similarly, Cobble creep can be related to mass transport phenomena occurring along grain boundaries of a polycrystalline material, and can also be inversely related to grain size. Conventional zircon refractory ceramics comprise zircon materials having large grain sizes so as to minimize grain boundaries, and thus Cobble creep. Use of zircon materials having a larger grain size can reduce the effects of Cobble creep, but can simultaneously result in an increase in the concentration and size of pores within the refractory body.

Conventional isopipes are typically prepared using zircon materials having a particle size of from about 1 µm to about 30 µm and can include substantial pores within their structure.

Figure 2:
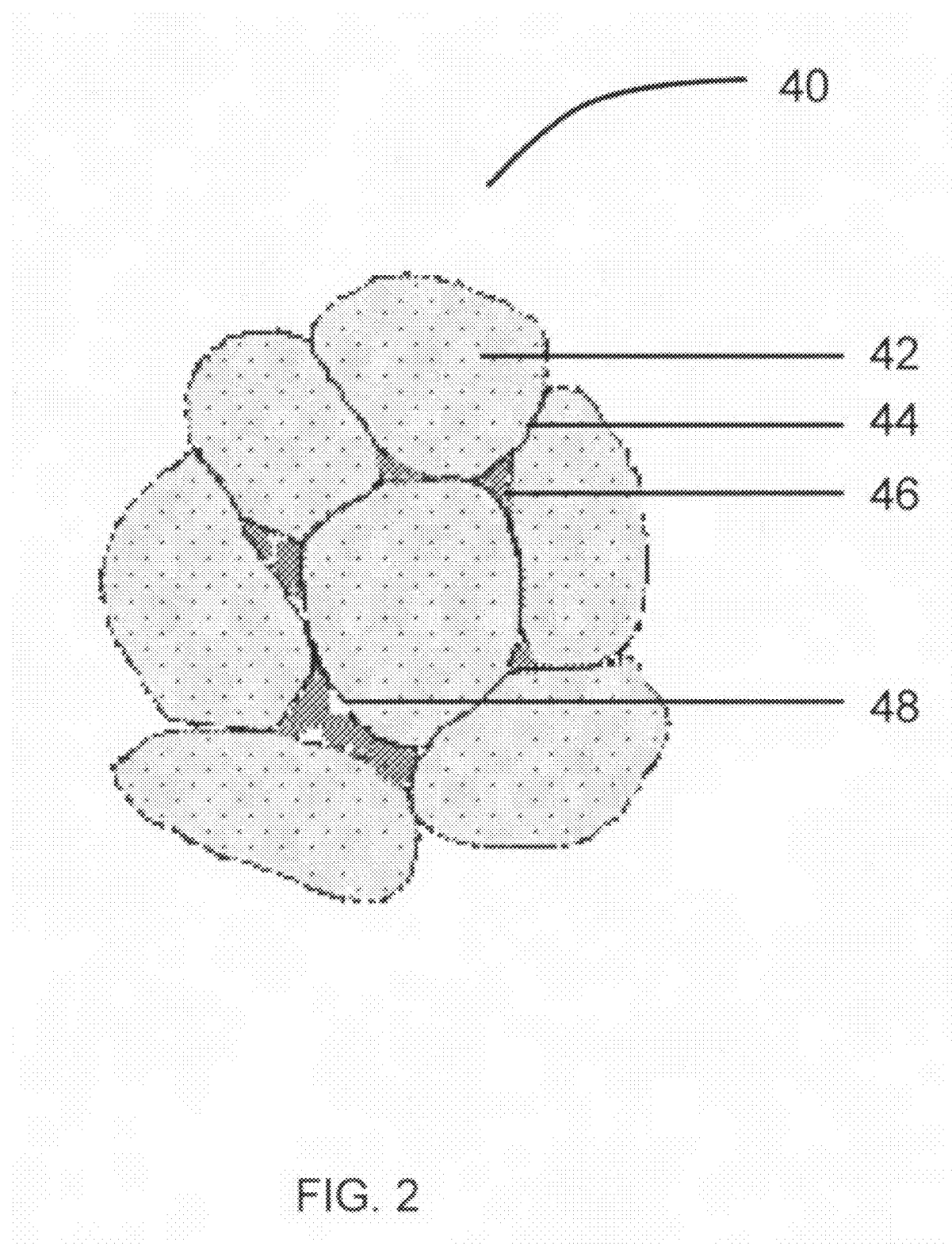
FIG. 2 is a theoretical model of a zircon composite in accordance with one aspect of the present invention.

With respect to FIG. 2, the present invention provides a method for manufacturing a refractory ceramic composite 40 that is more resistant to creep and resulting sag than conventional zircon materials. One advantage of the present invention is the reduction and/or elimination of point defects within the structure of a fired refractory ceramic body. This can be accomplished by mixing a preformed zircon 42 with a fine particle size zircon precursor. A fine particle size zircon precursor can have a median particle size of, for example, from less than 50 nm to about 100 nm, and can be present as agglomerates of up to about 5 µm. The zircon precursor can be prepared, for example, in-situ, and can form zircon particles 46 after firing. Such zircon particles, formed from the zircon precursor, can be larger in size than the zircon precursor particles and can have a median particle size of, for example, from about 0.1 µm to about 5 µm, such as for example, about 0.1, 0.2, 0.5, 0.9, 1, 1.2, 1.5, 2, 3, 4, or about 5 µm. A zircon precursor, such as that described herein, can fill in pores 48 in the structure of a refractory ceramic body, cover a portion of the grain boundaries 44 that form pores, and can also act as a bonding agent between grains of the pre-formed zircon. This bonding agent effect can allow a reduction or elimination in the amount of sintering aids, such as for example, $TiO_2$, $Fe_2O_3$, glass compounds, or a combination thereof, necessary to prepare and form a zircon refractory body. This combination of a zircon precursor and a preformed zircon can yield a refractory ceramic body, such as an isopipe, that has greater density, less pore volume and can provide improved creep resistance and longer operating lifetimes.

Zircon Precursor

The zircon precursor comprises a sol formed from at least one zirconia precursor and at least one silica precursor. The zircon precursor of the present invention can comprise at least one zirconia precursor, at least one silica precursor, and optionally at least one sol-gel forming agent. A zircon precursor, as used herein, refers to a product made by the methods of the present invention, specifically by contacting at least one zirconia precursor or a sol made from the at least one zirconia precursor, at least one silica precursor or a sol made from the at least one silica precursor, and at least one sol-gel forming agent. The optional sol-gel forming agent is provided, as necessary, in a quantity sufficient to form a zircon precursor. If the zirconia precursor and/or silica precursor are already provided in sufficient sol form to ultimately form a zircon precursor, then the addition of a separate sol-gel forming agent may not be necessary. In one aspect, separate sols comprising a zirconia precursor and a silica precursor can be provided and no sol-gel forming agent is added. In another aspect, a sol comprising at least one of the zirconia precursor and/or the silica precursor is provided and contacted with the remaining precursor, wherein the provided sol comprises a sufficient quantity of sol-gel forming agent to form a zircon precursor and no additional sol-gel forming agent is added. In yet another aspect, a sol is provided comprising at least one zirconia precursor, wherein the sol is contacted with at least one silica precursor and a quantity of sol-gel forming agent sufficient to form a zircon precursor. In yet another aspect, a sol is provided comprising at least one silica precursor, wherein the sol is contacted with at least one zirconia precursor and a quantity of sol-gel forming agent sufficient to form a zircon precursor.

The zirconia precursor of the present invention can be any zirconium containing material capable of forming zirconia and/or combining with silica to form zircon. In one aspect, the zirconia precursor is zirconyl nitrate hydrate, zirconium oxychloride, zirconium hydrate, or a combination thereof. The zirconia precursor can comprise a single or multiple individual zirconia precursors. In one aspect, the zirconia precursor is a zirconium hydrate. In another aspect, the zirconia precursor is a combination of a zirconium oxychloride and a zirconyl nitrate hydrate. An individual zirconia precursor can be provided in any suitable form, such as neat or as a dissolved and/or diluted solution. An individual zirconia precursor can be provided in any concentration sufficient to obtain a desired two component zircon precursor mixture, such as from greater than about 0 to about 100 wt. %, such as, for example, about 1, 2, 4, 8, 10, 20, 30, 50, 60, 70, 80, 85, 90, 95, 96, 97, 98, 99, or about 100 wt. %. Various zirconia precursors can be provided in different forms and/or concentrations. In one aspect, a single zirconia precursor, such as zirconium oxychloride, is provided in neat form. In another aspect, a combination of zirconyl nitrate hydrate and zirconium oxychloride is provided, wherein at least one of the individual zirconia precursors is provided in diluted form, such as for example, from about 10 wt. % to about 30 wt. %. Zirconia precursors are commercially available (Alfa Aesar, Ward Hill, Massachusetts, USA) and one of skill in the art would readily be able to select an appropriate zirconia precursor.

The silica precursor of the present invention can be any silicon containing material capable of forming silica and/or combining with zirconia to form zircon. In one aspect, the silica precursor can be a silica sol, a tetraethoxysilane, a silicon hydrate, a silicon tetrachloride, an amorphous silica, or a combination thereof. The silica precursor can comprise a single or multiple individual silica precursors. In one aspect, the silica precursor is a silica sol, such as Ludox® HS-40, and can have a median particle size of from about 10 to about 20 nm. In another aspect, the silica precursor is a fine particle size, such as for example, from about 3 nm to less than about 1 µm, silicon hydrate. The silica precursor can be a fine particle amorphous silica having a particle size distribution. In yet another aspect, the silica precursor is a combination of a silicon tetrachloride, a silica sol, and a tetraethoxysilane. An individual silica precursor can be provided in any suitable form, such as neat or as a dissolved and/or diluted solution. An individual silica precursor can be provided in any concentration sufficient to obtain a desired zircon precursor. Various silica precursors can be provided in different forms and/or concentrations. In one aspect, a single silica precursor, such as silicon tetrachloride, is provided in neat form. In another aspect, a combination of a fine particle size amorphous silica, a Ludox® HS-40 silica sol, and a dilute tetraethoxysilane solution are provided. Silica precursors are commercially available (W.R. Grace, East Chicago, Ind., USA) and one of skill in the art would readily be able to select an appropriate silica precursor.

The sol-gel forming agent of the present invention can be any such agent capable of forming a sol-gel with at least one of the zirconia precursor and/or the silica precursor. An individual and/or multiple individual sol-gel forming agents can be used to create a sol-gel comprising the zirconia and silica precursors. In one aspect, the sol-gel forming agent comprises at least one of ammonia, ammonium hydroxide, ammonium fluoride, or a combination thereof. In a preferred aspect, the sol-gel forming agent is ammonium hydroxide. The sol-gel forming agent can be provided in any form and concentration suitable for forming a sol-gel comprising at least one of the zirconia and/or silica precursors. For example, an ammonium hydroxide sol-gel forming agent can be provided at a standard concentration of about 14.5 Molar and can comprise from about 10 wt. % to about 15 wt. %, for example, about 10, 12, 14, or 15 wt. %, of the wet gel. Sol-gel forming agents are commercially available (Fisher Scientific, Fair Lawn, N.J., USA) and one of skill in the art would readily be able to select an appropriate sol-gel forming agent.

The preparation of a zircon precursor can comprise dissolving in a solvent at least one of the zirconia precursor, the silica precursor, or a combination of the zirconia precursor mixed with the silica precursor. The zirconia precursor and silica precursor can be dissolved in a single solvent either simultaneously or consecutively, or can be dissolved separately. It is not necessary that the solvent be the same if the zirconia precursor and the silica precursor are dissolved separately. In one aspect, the zirconia precursor is dissolved in a solvent such as, for example, water. In another aspect, both the zirconia precursor and the silica precursor are dissolved in water. In a further aspect, the separately dissolved precursors can be combined to form a single solution comprising both precursors.

At least a portion of the sol-gel forming agent can be contacted with one or more dissolved precursor solutions to form at least one sol-gel. The sol-gel forming agent can raise the pH of the dissolved precursor solution to a value of greater than about 7 to form a sol-gel. The sol-gel can comprise one or both of the zirconia and/or silica precursors.

The dissolution, mixing, and sol-gel forming steps described herein can be performed in any order that provides a sol-gel comprising a zirconia precursor and a silica precursor. In one aspect, a sol-gel is first formed by contacting a zirconia precursor with a sol-gel forming agent, to which a silica precursor is then added. In another aspect, a sol-gel is formed by mixing both a zirconia precursor and a silica precursor with a sol-gel forming agent. In yet another aspect, separate sol-gel solutions are formed, each comprising one of the zirconia and silica precursors. The separate sol-gel solution can then be combined to form a single sol-gel solution comprising both precursors. In another aspect, the zirconia precursor and silica precursor can be contacted with each other or with a sol made from at least one of the zirconia and/or the silica precursor. In a specific aspect, a silica precursor is contacted with a sol formed by contacting a zirconia precursor and a sol-gel forming agent.

The zirconia and silica precursors and/or sol-gel solutions comprising the precursors can be contacted and/or mixed in any desired ratio. In one aspect, the zirconia precursor is added at a molar ratio of about 1.5:1 to the silica precursor. In another aspect, the zirconia and silica precursors are added in substantially stoichiometric amounts. In a preferred aspect, the zirconia and silica precursors are added in stoichiometric amounts.

The zircon precursor can be maintained and/or used as a solution and/or as a dried precursor powder. A zircon precursor sol-gel solution can be dried by, for example, heating the sol-gel for a period of time at a temperature and/or pressure sufficient to remove at least a portion of the solvent and/or liquid of the solution. In one aspect, the formed zircon precursor sol-gel solution is dried by heating a zircon precursor gel, comprising both zirconia and silica precursors, at a temperature of from about 90° C. to about 130° C. for a period of at least about 2 hours, preferably at least about 4 hours. In a specific aspect, the heating is at a temperature of about 120° C. for a period of at least about 4 hours. A zircon precursor solution, when mixed with a preformed zircon, can coat at least a portion of the surface of the preformed zircon, nucleate, and bond with at least a portion of the surface. In another aspect, a zircon precursor powder is prepared by first contacting a zirconia precursor, a silica precursor, and an ammonium hydroxide sol-gel forming agent, and then drying the resulting sol-gel. The specific time, temperature, and pressure conditions of a drying step are not critical and can be any that can provide a zircon precursor powder. In another aspect, the zircon precursor sol-gel solution is dried, and the resulting powder subsequently mixed with liquid to form a slurry and/or solution. In another aspect, the zircon precursor sol-gel solution is used as formed.

Preparation of Zircon Composite

The preformed zircon of the present invention can be any such zircon suitable for forming an isopipe or desired refractory ceramic body. The preformed zircon can be manufactured or can be purchased commercially (Ferro Corporation, Penn Yan, N.Y., USA). In one aspect, the preformed zircon has a median particle size (D50) of from about 3 µm to at least about 10 μm, at least about 20 μm, or at least about 30 μm. In a specific aspect, the preformed zircon has an average particle size of at least about 20 μm. In one aspect, the preformed zircon has an average particle size of at least about 5 times, at least about 7 times, or at least about 10 times the particle size of the zircon formed from the zircon precursor. In another aspect, the zircon formed from the zircon precursor has a particle size smaller than the particle size of the preformed zircon.

The preformed zircon of the present invention can be contacted and/or mixed with the remaining components (e.g., at least one of the zirconia and/or silica precursor and a sol-gel forming agent) at any time prior to forming a desired shape. In one aspect, the preformed zircon is mixed with the zircon precursor solution described above, once formed. In another aspect, the preformed zircon is mixed with a zircon precursor powder. In another aspect, the preformed zircon is mixed with a sol-gel solution comprising at least one of the zirconia and/or silica precursors.

The amount of preformed zircon contacted with a zircon precursor can vary depending upon the particle size of the preformed zircon and the concentration and amount of zircon precursor intended to be used. The ratio of preformed zircon to zircon precursor can be any such ratio that can provide a zircon refractory body having minimal grain boundary and minimal pores within its structure, such as for example, less than about 20%, less than about 10%, less than about 5%, or less than about 1% pores by volume. In one aspect, the ratio of preformed zircon and zircon precursor is that providing less than about 10% pores, preferably less than about 5% pores by volume, in the fired zircon refractory body. In another aspect, the zircon precursor in the mixture of the zircon precursor and the preformed zircon comprises from about 3 to about 20 volume %, preferably from about 5 to about 15 volume %. In another aspect, the zircon precursor comprises from about 5 to about 15 volume % of the mixture of the zircon precursor and the preformed zircon and is present at a ratio with the preformed zircon that provides less than about 10 % pores by volume.

The zircon formed in-situ from a zircon precursor can act as a sintering aid, thereby reducing or eliminating the need for a sintering aid. One or more traditional sintering aids can also be added to the preformed zircon, the zircon precursor, or a combination thereof prior to forming into a desired shape. The sintering aid can comprise any material suitable for the desired zircon refractory body and can comprise for example, $TiO_2$, $Fe_2O_3$, glass compounds, or a combination thereof, and can be added in any suitable amount, such as for example, from about 0.1 to about 5 wt. %, or 0.1, 0.2, 0.5, 0.9, 1, 1.3, 1.8, 2, 2.5, 3, 4, or 5 wt. %. In one aspect, a sintering aid is added to a mixture of preformed zircon and the zircon precursor described above. The use of and amount of a particular sintering aid can vary depending upon the nature of the composition and the method of forming a desired shape. For example, a method to produce an isopressed zircon refractory body can require a lower wt. % of a sintering aid than an extruded zircon refractory body. In one aspect, a method to produce a zircon refractory body does not require the use of sintering aids. In another aspect, a method to produce an isopressed zircon refractory body can comprise about 1 wt. % of a sintering aid, such as $TiO_2$.

The mixture of zircon precursor and preformed zircon can be optionally mixed to obtain a uniform or substantially uniform homogeneous mixture. Such a mixing step can comprise, for example, a turbulent mixing method for a dry powder, or a high shear mixing method for a combination of dry and wet materials. An exemplary mixing process can be performed with a Processall® mixer, available from Processall Incorporated, Cincinnati, Ohio, USA. A high shear mixer, such as a Processall mixer, is preferred in order to obtain a homogeneous blend of zircon precursor and preformed zircon powders. Various mixing technologies are known in the art and one of skill in the art could readily select an appropriate mixing technique.

Formation of a Desired Shape

The resulting mixture of zircon precursor and preformed zircon can be formed into a green body of any desired shape, such as that of an isopipe. A green body, as used herein, comprises a formed, but unfired ceramic material. The forming step can comprise any appropriate forming technique, including those known in the refractory ceramic industry. Unlike many conventional refractory ceramic materials, the pre-fired composition of the present invention can be extruded to provide a desired shape. The forming step can comprise an extrusion process, an isostatic pressing process, a slip casting process, or a combination thereof. In one aspect, the forming step is an extrusion process where the composition is extruded in the form of an isopipe. In another aspect, the pre-fired composition can be iso-pressed to provide a desired shape. The pre-fired composition can be subjected to a tapping and/or a vacuum step to achieve a high degree of compaction at ambient conditions, and then be isostatically pressed at about 18,000 psi for a period of from about 5 to about 20 minutes.

Thereafter, the refractory can be prepared in accordance with techniques currently known in the art or with improved techniques which may be developed in the future. The refractory can be fired to convert at least a portion of the zircon precursor to zircon and to sinter at least a portion of the zircon in the composition. A firing step can comprise heating the formed green body at a time and temperature sufficient to form a stable refractory ceramic body. In one aspect, the firing step can comprise heating a formed green body in an electrical furnace at a temperature of from about 1,400° C. to about 1,650° C. for a period of from about 1 to about 48 hours. In another aspect, the firing step can comprise heating a formed green body in an electrical furnace at a temperature of from about 1,400° C. to about 1,600° C. for a period of from about 2 to about 24 hours. Firing techniques for refractory ceramics are known and one of skill in the art would readily be able to select and perform an appropriate firing step for a refractory ceramic composition of the present invention.

Fired Refractory Ceramic Body

During firing, at least a portion of the zircon precursor is converted to zircon. In one aspect, all or substantially all of the zircon precursor is converted to zircon. In a preferred aspect, all of the zircon precursor is converted to zircon. The in-situ formed zircon can act as a bonding agent between particles or grains of preformed zircon within the refractory ceramic body. In one aspect, the resulting refractory ceramic body comprises a high-purity zircon. The strength of resulting refractory ceramic body and its resistance to creep and/or sag is dependent, in part, on the amount of pore space occupied by the in-situ formed zircon and the amount of pore space remaining in the refractory ceramic body. A refractory ceramic body having less pore space volume within its structure will generally exhibit a greater resistance to creep than a body with greater pore space volume.

Depending upon the use of optional sintering aids, the in-situ zircon formed in the present invention can comprise a high-purity zircon.

After firing for a sufficient period of time, a refractory ceramic body can be free of or substantially free of residual zirconia and/or silica. In a preferred aspect, all of the zircon precursor is converted to zircon and the refractory body is free of residual zirconia and/or silica. The specific composition and amount of any residual zirconia and/or silica can be dependent on the amount and ratios of the specific precursors used, as well as the firing conditions.

Although several aspects of the present invention have been illustrated in the accompanying drawings and described in the detailed description, it should be understood that the invention is not limited to the aspects disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Synthesis of Zircon

Figure 3:
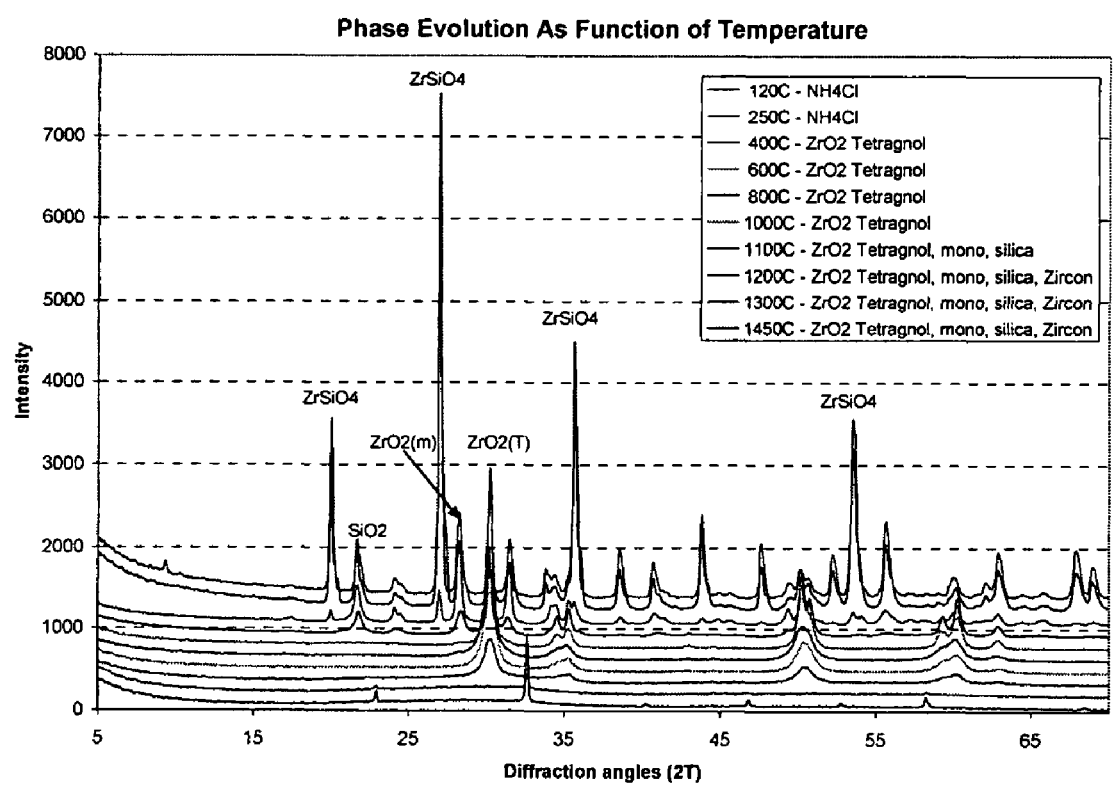
FIG. 3 represents data from X-ray diffraction experiments illustrating a phase change associated with the formation of a zircon material, in accordance with one aspect of the present invention.

In a first example, a zircon material was synthesized from a zircon precursor, in the absence of a preformed, commercial zircon. Approximately 250 grams of zirconium oxychloride ($ZrOCl_2.8H_2O$) was dissolved in approximately 125 grams of water by stirring under ambient conditions to form a clear solution. After complete dissolution of the zirconium oxychloride, approximately 116.46 grams of Ludox® HS-40 was added to the solution (molar ratio of 1:1 zirconium oxychloride to amorphous silica). The resulting precursor solution had a cloudy appearance, but maintained a stable suspension. The storage life of the precursor solution can be a period of multiple months or more. Ammonium hydroxide was then added to the precursor solution at a weight ratio of 1:3 with respect to the zirconium oxychloride. The resulting wet gel was then dried at a temperature of about 100° C. to 120° C. for 24 hours. After drying, the powder was fired to form zircon. FIG. 3 illustrates the phase evolution during zircon formation. The initial structure is $NH_4Cl$ where the Zr, O, and Si are in an amorphous state. At about 1,200° C., zircon is formed in a reaction that consumes the $ZrO_2$ and $SiO_2$. At temperatures up to about 1,400° C., the formed zircon comprises a small residual amount of $ZrO_2$ and $SiO_2$.

Example 2

Fabrication of Isopipe from Zircon Precursor Powder and Preformed Zircon

In a second example, a mixture of a powdered zircon precursor and a preformed zircon was prepared. A powdered zircon precursor was prepared according to the procedure of Example 1 (prior to firing). A Processall® mixer was then used to disperse agglomerates of the powdered zircon precursor in an aqueous solution. The dispersed zircon precursor was then mixed with preformed zircon having a D50 particle size of 7 μm. The resulting mixture was extruded in the form of an isopipe bar and fired at about 1,600° C. for 6 hours. As in Example 1, the zircon precursor converts to zircon during firing. The density of the fired isopipe bar was about 3.37 $g/cm^3$.

Example 3

Fabrication of Isopipe from Zircon Precursor Solution and Preformed Zircon

In a third example, a mixture was prepared of a zircon precursor solution and a preformed zircon having a D50 particle size of 7 μm. A zircon precursor solution was prepared according to the procedure of Example 1 (prior to drying). The surface of the preformed zircon was coated with the zircon precursor solution by ball milling the mixture. After milling, the resulting powder was dispersed using a micronizer, and sifted through a 325 mesh (approximately <44 μm) screen. The sifted powder was then iso-pressed to form isopipe bars that were subsequently fired. The density of the isopipe bars formed in this example ranged from 4.08-4.45 $g/cm^3$.

Various modifications and variations can be made to the compositions, articles, devices, and methods described herein. Other aspects of the compositions, articles, devices, and methods described herein will be apparent from consideration of the specification and practice of the compositions, articles, devices, and methods disclosed herein. It is intended that the specification and examples be considered as exemplary.

What is claimed is:

1. A method of making a zircon composition comprising:
   contacting at least one zirconia precursor and/or a sol made from the at least one zirconia precursor, at least one silica precursor and/or a sol made from the at least one silica precursor, with a preformed zircon powder, wherein the contacting is in any order, and the median particle size of the preformed zircon powder is from about 3 μm to about 30 μm; and the zirconia precursor and the silica precursor as a zircon precursor comprise from about 5 to about 15 volume% of the mixture of the zircon precursor and the preformed zircon powder;
   forming a green body from the mixture of the zirconia precursor, the silica precursor and the preformed zircon powder, with a desired shape; and
   firing the green body to obtain a zircon refractory body.

2. The method of claim 1, wherein at least one sol-gel forming agent is present in a quantity sufficient to form a sol of the at least one zirconia precursor and the at least one silica precursor.

3. The method of claim 1, wherein the at least one zirconia precursor comprises at least one of zirconyl nitrate hydrate, zirconium oxychloride, zirconium hydrate, or a combination thereof.

4. The method of claim 1, wherein the at least one silica precursor comprises at least one of tetraethoxysilane, silicon hydrate, silicon tetrachloride, amorphous silica, or a combination thereof.

5. The method of claim 2, wherein the sol-gel forming agent comprises at least one of ammonia, ammonium hydroxide, ammonium fluoride, or a combination thereof.

6. The method of claim 1, wherein the at least one zirconia precursor and the at least one silica precursor are contacted in a stoichiometric amount.

7. The method of claim 1, further comprising contacting the at least one zirconia precursor and/or the sol made from the at least one zirconia precursor, the at least one silica precursor and/or the sol made from the at least one silica precursor, the at least one sol-gel forming agent, the preformed zircon, the mixture of zircon and a zircon precursor, or a combination thereof with a sintering aid.

8. The method of claim 1, wherein the forming comprises at least one of an extrusion process, an iso-press process, or a slip casting process, or a combination thereof.

9. The method of claim 1, wherein the forming comprises an iso-press process.

10. The method of claim 1, wherein the desired shape is an isopipe.

11. The method of claim 1, further comprising firing the desired shape at a time and temperature sufficient to form a zircon composite.

12. The method of claim 11, wherein the firing comprises heating the desired shape at a temperature of from about 1,400° C. to about 1,650° C. for a period of from about 1 to about 48 hours.

13. The method of claim 11, wherein a zircon formed from the zircon precursor has a median particle size smaller than the median particle size of the preformed zircon.

14. The method of claim 1, wherein the contacting step comprises:

contacting at least a portion of the at least one zirconia precursor and/or the sol made from the at least one zirconia precursor, at least a portion of the at least one silica precursor and/or the sol made from the at least one silica precursor, and/or at least a portion of the at least one sol-gel forming agent to form a zircon precursor; and then contacting at least a portion of the preformed zircon.

15. The method of claim 14, wherein the at least a portion of the at least one zirconia precursor and the at least a portion of the at least one silica precursor are contacted first, prior to contacting the at least a portion of the at least one sol-gel forming agent.

16. The method of claim 14, wherein one of the at least a portion of the at least one zirconia precursor or the at least a portion of the at least one silica precursor is first mixed with the at least a portion of the at least one sol-gel forming agent, and then contacted with a remaining zirconia precursor and/or silica precursor.

17. The method of claim 14, wherein at least a portion of the at least one zirconia precursor is dissolved in a solvent prior to contacting with the at least a portion of the at least one silica precursor.

18. The method of claim 17, wherein the solvent is water.

19. The method of claim 14, further comprising drying the zircon precursor prior to contacting with the at least a portion of the preformed zircon.

20. The method of claim 19, wherein the drying comprises heating the zircon precursor to a temperature of from about 90° C. to about 130° C. for a period of at least about 2 hours.

21. The method of claim 14, wherein the zircon precursor is a liquid.

22. The method of claim 14, wherein the zircon precursor is a powder.

* * * * *